July 31, 1962 J. L. BERRYHILL 3,047,675

DIGITAL DATA RECORDING DEVICE

Filed June 19, 1959

INVENTOR.
Joseph L. Berryhill
BY
Townsend and Townsend
attorneys 3,047,675

DIGITAL DATA RECORDING DEVICE

Joseph L. Berryhill, San Anselmo, Calif., assignor to Mechron, San Francisco, Calif., a corporation of California Filed June 19, 1959, Ser. No. 821,478
3 Claims. (Cl. 179—100.3)

This invention relates to a device for recording digital information on sprocket driven strips.

More particularly the invention relates to a method of and means for providing coded information between sprocket holes of a strip of material such as motion picture film. The position of the coded information between the sprocket holes provides precise timing of the information with pictorial, optical or magnetic information carried on the body of the strip itself.

Normally 16 millimeter motion picture films are constructed with a series of sprocket holes on one side of the film which are in registration with the photographs on the film so that they bear a definite time relationship to the particular pictorial designation on the film. The opposite side of commercial 16 millimeter films are provided with a sound track either magnetic or optical which is also mechanically referenced in time synchronization with the pictures carried by the film and the sprocket holes. The conventional 35 millimeter film includes sprocket holes on both sides with the sound track sandwiched between one set of sprocket holes and the pictorial images.

The principal object of this invention is to provide a series of coded bits of information which may be placed between selected sprocket holes of a motion picture film in such a way that when the film is run through a projector the coded bits of information will convey instructions to the mechanism controlling the audio and visual apparatus used for the projection of the picture and the reproduction of the audio part of the film. Such control may, for example, be used to effectively increase or diminish the intensity of light in the projected image or may increase or decrease the volume or signal strength of the audio portion of the film. In addition such coded information may control the starting or stopping of the mechanical mechanism of the projector or alternatively may increase or decrease the speed of the projecting apparatus. In the event that the device is used in combination with a magnetic strip which is operated by a sprocket drive the coded information between the sprocket holes on the magnetic tape may similarly control such functions. If the tape be a television video tape the coded bits of information between the sprocket holes may effectively cause the apparatus for reproducing the video tape to increase or decrease the intensity of the video or audio portion of the signals or may control mixing devices for switching various channels in the form of overlap or lap dissolve sequences by the gradual increase and respective decrease of signals from one channel to the other. The location of the sprocket holes is mechanically a pre-aligned reference to the timing of information carried by the tape or film so that the mechanical superposition of coded bits of information between the sprocket holes allows for the physical placement of the coded bits in precise time relationship to the signal information carried by the strips themselves.

Other objects of the present invention will become apparent upon reading the following specification and referring to the accompanying drawings in which similar characters of reference represent corresponding parts in each of the several views.

Figure 1:
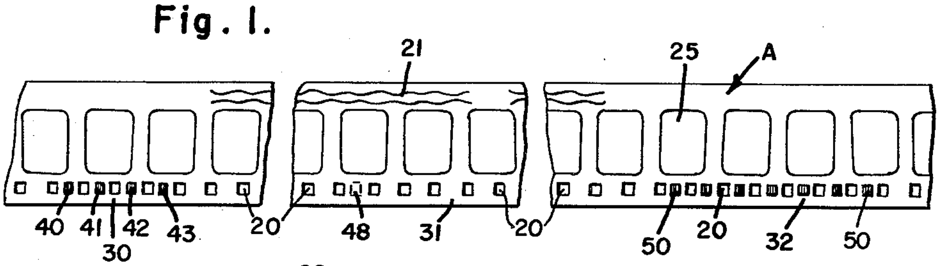
FIG. 1 is a top plan view of segments of motion picture film shown with coded bits of information positioned between the respective sprocket holes of the film.

The film strip of FIG. 1 is generally designated at A and is of conventional format wherein it includes on one side of the film a series of sprocket holes 20 which are arranged to be engaged by the sprocket and the claw mechanism which carries the film through the motion picture projector.

The opposite side of the film is provided with a sound track indicated at 21. The sound track, shown in FIG. 1, is an optical track. However, it is to be understood that a magnetic sound track could equally well be employed. Between the two edges of the film are provided the respective frames 25 of the film which form the motion picture when the film strip is run through a projector.

The film strip for convenience is shown divided into three segmented parts solely for the sake of illustration indicated at 30, 31 and 32. Segment 30 is provided with four conductive spots 40, 41, 42 and 43. The conductive spots may be formed by painting a small spot of metallic ink on the film or by placing a small piece of tape having a metallic face and a pressure sensitive adhesive on the opposite side of the tape to affix the spot on the film between sprocket holes 20.

Film segment 31 is provided with a single metallic or conductive spot 48 located on the reverse side of the film between two of the sprocket holes 30. Film segment 32 is provided with seven spots 50 which rather than being conductive are formed of a non-conductive opaque coating.

The coded bits of information such as indicated at 40, 41, 42, 43, 48 and 50 of segments 30, 31 and 33 respectively can be placed to accomplish a variety of control functions when the film strip is run through a projecting system.

To illustrate the principal embodiment of the invention and to illustrate one particular use of the device it is noted that in television broadcasting that the programing material carried by films is often spliced together so that the films from various sources are applied one after the other on a continuous reel of film. However, due to the different specifications of the films the sound track is often recorded of different intensity so that it is necessary to re-adjust the volume when there is a change in message. For example, the program from a regular movie may have a relatively lower audio output than the commercial.

Figures 2, 3:
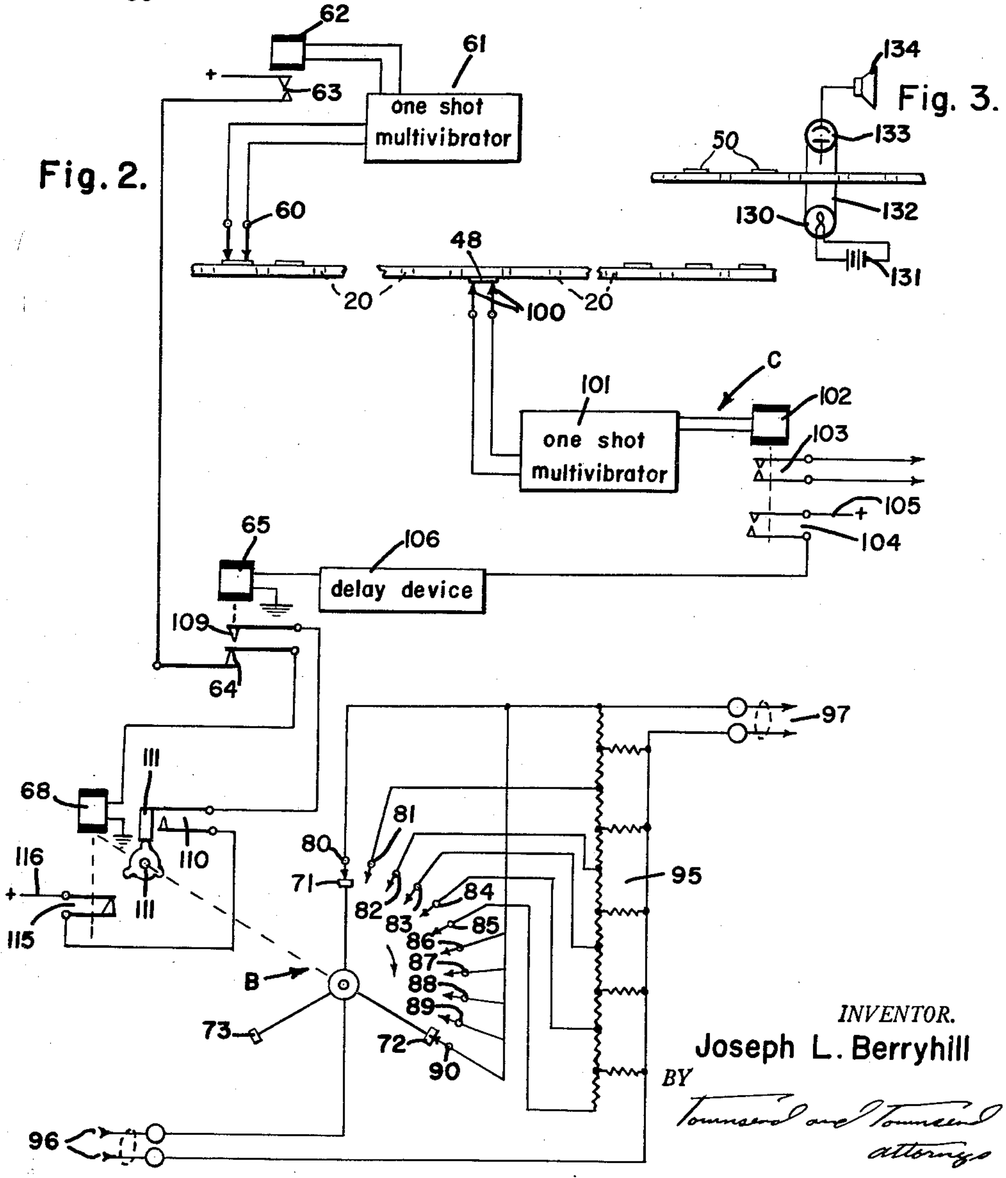
FIG. 2 is a schematic showing one application of the device particularly useful in the regulation of the audio volume between various sequences carried by the film strip.
FIG. 3 is a modification of the reading apparatus which incorporates means for optically reading the bits of coded digital information between sprocket holes.

In the embodiment of FIG. 2 there is provided a device which will change the volume of the audio output of the film in accordance with the instructions carried by the digital coded bits of information on the film. To accomplish this result there is provided a sensing station at 60 which comprises two brushes arranged to wipe the film strip and see a closed contact and register a closed circuit through the brushes when a coded bit is moved past the sensing station. When there is electrical communication made between the two brushes 60 a one-shot multivibrator 61 is arranged to actuate a relay 62. The purpose of the multivibrator is to provide sufficient current output to actuate the relay.

Relay 62 is arranged when energized to close normally open contact points 63 so as to cause the current to pass through normally closed contact points 64 of a relay 65 to actuate a relay 68. Relay 68 is connected to operate a stepping relay or counter type switching device indicated at B. Switching device B comprises a continuous rotor having three brushes 71, 72 and 73 which are arranged to alternately make contact with one of ten contact terminals 80 through 90. When each time relay 68 is actuated brushes 71, 72 or 73 are arranged to advance to the next of the contact terminals 80 through 90. The contact terminals are connected to a resistance network attenuator 95. The audio output from the film is supplied to two terminals 96 and through the attenuator 95 to the output terminals 97. The attenuator is operable in the conventional fashion to insert greater resistance in the circuit as brushes 71, 72 or 73 advance to the next terminal 80 through 90 which effectively functions to decrease the effective signal output at the output 97. Reverse operation could increase the signal output.

Thus it can be seen in operation that the number of conductive spots present on film strip A will determine the number of positions the wiper will advance in switching device B. The volume controlling spots 40, 41, 42 and 43 are placed at the termination of a film strip in sufficient number so as to adjust the volume for the next strip to the proper volume so that there is an equalization of volume between the two spliced strips, or are placed at the beginning of each strip.

There is provided a resetting device generally indicated at C which operates to reset switching device B at the termination of a strip and prepare switching device B to be reset for the next film strip. The resetting device comprises a pair of brushes 100 which are arranged on the side of the film strip opposite brushes 60 in such a way as to see a closed circuit when the conductive spot 48 passes brushes 100. The output of sensing brushes 100 is supplied to a one-shot multi-vibrator 101 which actuates a relay 102. Relay 102 controls two pair of normally open contact points 103 and 104. Relay contact point 103 may be employed to operate auxiliary equipment which may be used, for example, to shift projectors, channels or to temporarily stop the projector so that a live announcement can be made or simply notifying an operator that the film is approaching its end.

Relay contact points 104 are connected to a source of power indicated at 105 to connect the source of power to start in actuation a delay device 106. Delay device 106 is arranged to close a circuit immediately upon switching contact points 104 being closed and to retain the contact points closed for a predetermined time delay, for example, in the order of several seconds.

When delay device 106 is in operation relay 65 is actuated which causes the armature of relay 65 to transfer to cause the armature to open switch contact 64 and close switch contacts 109. With relay contact point 109 being in the closed position there is provided a closed circuit between relay contact points 110 and an armature 111 which is actuated by a rotating distributor in such a manner that the armature is in the normal position except when the wiper blades 71, 72 or 73 are in position with terminals 80 and 90 respectively in which cases the armature is in contact with the alternate contacts to close switch contact points 112.

Relay 68 is also provided with a pair of normally closed relay contact points 116 which connect a source of current as indicated at 116 through normally closed contact points 110 and contact points 109 to the relay 68 thus energizing relay 68 and consequently opening contact point 115. This causes a continuous oscillation of making and breaking of the current to relay 68 to effectively continue the advancement of the switching apparatus B. When the switching apparatus B is in a position wherein wiper blades 71, 72 or 73 are engaged with terminals 80 and 90 respectively the distributor operates armature 111 to open the circuit path of relay 68 and interrupt contacts 115 so that the wiper blades remain engaged with terminals 80 and 90.

In operation when spot 48 passes brushes 100 the multivibrator causes relay 102 to start the delay device 106 to operate which in turn sets up the advancement of switching device B until the device returns to its home or starting position. Thereafter when the spots 40, 41, 42 and 43 of the strip of film pass brushes 60 the switching device B will again be rotated to the proper position to provide the requisite control of the audio volume.

In the embodiment of FIG. 3 a modification of the sensing device is employed in which a light source 130 is provided under the film strip. The light source is continuously powered from a power source 131 and the light is channeled to an area of the film approximately the space between sprocket holes 20 by a light shield 132. A photo cell 133 is arranged to view the light from light 130 and to amplify the output by an amplifier 134. The output of amplifier 134 can be applied to a multivibrator as indicated at 61 or 101 or any other suitable device to operate a switching mechanism of any desired type. Thus when the opaque spots 50 are arranged to pass photo shield 132 and light source 130 there is an interruption of the light as the spot passes the bulb and photo shield which causes a pulse output which may be used to operate a mechanism such as shown in FIG. 2.

It is also believed apparent that rather than passing light through the film, spots 50 can be formed of reflective material and the light source can be arranged to shine on the top portion of the film wherein the photo cell will register the difference of reflection in order to determine the presence or absence of the spots. It can be seen, therefore, that the sprocket holes provide a mechanical guide so that the spots between the holes are in precise timed relationship apart and the spots are positioned in precise synchronization with the photograph and audio information strip.

It is further apparent that the provision of different types of recorded information can be used to operate different types of mechanism and that the sequence of a plurality of spots can be arranged to operate a counter mechanism such as switch B or possibly a conventional ring counter so as to obtain from the digital output an effective continuous control of a function such as volume, light intensity or continuous switching as would be necessary were it desirable to turn one projector off and another projector on in such a way that one signal would gradually fade out and the other fade in at a rate and at a time determined by the position of the spots relative to the film. By this device a lap dissolve can be effected.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A device for controlling output of information reproduced from a sprocket driven strip of the type having a plurality of uniformly spaced and dimensioned sprocket holes aligned longitudinally on at least one edge of the strip and by which the strip is driven through a reproducing device the combination of at least one cluster of markings mounted on said strip only between sprocket holes and referenced to information carried by said strip whereby the sprocket holes form a consistent spacing between markings, means to sense and count the number of markings in each cluster of markings, and means responsive to the marking count to control the output of information reproduced from the strip.

2. In a device for controlling the output gain of audio or visual information reproduced from a sprocket driven film of the type having a plurality of sprocket holes aligned longitudinally on at least one edge of the film the combination of a cluster of spaced apart spots mounted on the sprocket hole side of the film in such a manner as not to interfere with the information carried by said film, each cluster of spots having a first spot and at least one second spot, said second spot being located on the opposite side of the film from said first spots, counter means to electrically sense and count said second spots in each cluster, gain control means to adjust the output gain of information reproduced from said film, said gain control means being controlled by said counter means to provide an output gain directly proportional to the number of spots counted by counting means, means to electrically sense said first spots, and means operable each time a first spot is sensed by said first spot sensing means to reset said counter means to a zero position.

3. In a device for controlling the output of information reproduced from a sprocket driven strip of the type having a plurality of sprocket holes aligned longitudinally on one edge of the strip the combination of: a plurality of conductive spots located between selected sprocket holes on one side of said strip; first spot sensing means to sense said conductive spots when said strip is run through a reproducing device; counting means operated by said first spot sensing means to count the number of spots sensed by said first spot means; and control means connected to said counting means to control the output of information reproduced from said strip; and at least one conductive spot on the opposite side of said strip between selected sprocket holes; second spot sensing means to sense said second conductive spot; and resetting means connected to said counter means and operated by said second spot sensing means to reset said counter means to a starting position each time said second spot sensing means senses a conductive spot.

References Cited in the file of this patent

UNITED STATES PATENTS

| | | |
|---|---|---|
| 1,950,518 | Read | Mar. 13, 1934 |
| 1,956,351 | Hershey | Apr. 24, 1934 |
| 2,314,382 | Batsel | Mar. 23, 1942 |
| 2,307,825 | Davis | Jan. 12, 1943 |
| 2,330,331 | Blaney | Sept. 28, 1943 |
| 2,540,654 | Cohen et al. | Feb. 6, 1951 |
| 2,561,181 | Glutier et al. | July 17, 1951 |
| 2,817,829 | Lubin | Dec. 24, 1957 |